United States Patent

[11] 3,624,026

[72] Inventor William O. Drake
Bartlesville, Okla.
[21] Appl. No. 819,529
[22] Filed Apr. 24, 1969
[45] Patented Nov. 30, 1971
[73] Assignee Phillips Petroleum Company

[54] STABILIZATION OF RADIAL BLOCK
COPOLYMERS
18 Claims, No Drawings

[52] U.S. Cl. ................................................ 260/41,
260/45.75, 260/45.8, 260/880
[51] Int. Cl. ...................................................... C08f 1/84,
C08f 15/04

[50] Field of Search ................................................ 260/880 R,
880 B, 45.75, 45.8, 41

[56] References Cited
UNITED STATES PATENTS

| | | | |
|---|---|---|---|
| 3,251,905 | 5/1966 | Zelinski | 260/880 B |
| 3,282,886 | 11/1966 | Gadecki | 260/45.75 |
| 3,454,521 | 7/1969 | Tholstrup | 260/45.75 |

Primary Examiner—Harry Wong, Jr.
Attorney—Young and Quigg

ABSTRACT: Disclosed herein are stabilized compositions comprising a radial block copolymer admixed with the following additives: organic phosphite, metal alkyldithiocarbamate, benzotriazole, thiodipropionic acid ester, and carbon black.

STABILIZATION OF RADIAL BLOCK COPOLYMERS

This invention relates to stabilized compositions comprising a radial block copolymer admixed with additives.

Polymers produced from a conjugated diene and a vinyl-substituted aromatic compound have achieved significant industrial importance in recent years. Virtually all industrial and commercial uses of polymers of a conjugated diene and vinyl-substituted aromatic compound require that they be stabilized against degradation from exposure to thermal effects or light, particularly in the ultraviolet range, or a combination of the two. Specifically, polymers of butadiene-styrene, and their monomeric equivalents, can be stabilized and used to make tires, rubber products of various sorts, adhesives, and many other industrially valuable products.

In one embodiment of this invention, a radial block copolymer is stabilized against degradation through exposure to thermal effects by admixing therewith zinc alkyldithiocarbamate. In another embodiment of this invention, a radial block copolymer is stabilized against degradation through exposure to light, particularly in the ultraviolet range, by the addition of a benzotriazole. In another embodiment, a radial block copolymer is compounded with a benzotriazole and an organic phosphite or zinc dialkyldithiocarbamate to produce a composition stabilized against degradation through exposure to light, particularly in the ultraviolet range. In still another embodiment, a radial block copolymer is compounded with an organic phosphite, zinc alkyldithiocarbamate and either carbon black, to produce a composition stabilized against degradation through exposure to light, particularly in the ultraviolet range, or compounded with a benzotriazole to produce a composition stabilized against degradation through exposure to thermal effects or light. In one still further embodiment, a composition stabilized against degradation due to light, particularly in the ultraviolet range, is compounded by admixing a radial block copolymer with an organic phosphite, zinc alkyldithiocarbamate, a benzotriazole, and either carbon black or a thiodipropionic acid ester.

Accordingly, this invention provides for composition of matter useful for industrial and commercial applications by exhibiting stability against degradation through thermal effects or light, particularly in the ultraviolet range.

The radial block copolymers stabilized in this invention are polymers of a conjugated diene and a vinyl-substituted aromatic compound and are made according to U.S. Pat. No. 3,281,383 issued to Zelinski et al. on Oct. 25, 1966. In summary, the radial block copolymers comprise organometallic initiated branch block copolymers having at least three polymer branches, each branch comprises two or more dissimilar jointed polymer segments and each segment can comprise a sequence of units of a substantially single monomer, but alternating segments of the branch can also be of a sequence or randomly copolymerized unit. It is preferable that the terminal blocks in each of the radial branches comprise styrene or a suitable substituted vinyl aromatic monomer. Examples of conjugated dienes useful with this invention include 1,3-butadiene, isoprene, 2,3-dimethyl-1,3-butadiene, piperylene, 3-butyl-1,3-octadiene, phenyl-1,3-butadiene, and mixtures thereof. Examples of vinyl-substituted aromatic compounds include styrene, 3-methylstyrene, 4-n-propylstyrene, 4-cyclohexylstyrene, 4-dodecylstyrene, 2-ethyl-4-benzylstyrene, 4-p-tolylstyrene, 4-(4-phenyl-n-butyl)styrene, and mixtures thereof.

The relative amounts of butadiene and styrene, or their conjugated diene and vinyl-substituted aromatic equivalents, can vary over a wide range. Although, based on the weight of the radial block copolymer, the conjugated diene can exist in the range from about 70–50 weight per cent, or even more or less, and the vinyl-substituted aromatic compound can exist in the range from about 30–50 weight percent, or even more or less, outstanding results are achieved when the conjugated diene is in the range from about 70–60 weight per cent of the polymer and the vinyl-substituted aromatic compound is in the range from about 30–40 weight per cent of the polymer.

The zinc alkyldithiocarbamate used in this invention in order to produce a composition stabilized against degradation due to thermal effects can comprise any zinc alkyldithiocarbamate of the general formula

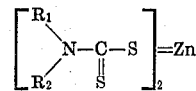

where R1 and R2 are alkyl, cycloalkyl radicals having 1–23 carbon atoms. Examples are:
  zinc dimethyldithiocarbamate
  zinc diisopropyldithiocarbamate
  zinc dibutyldithiocarbamate
  zinc butylnonyldithiocarbamate
  zinc diamyldithiocarbamate
  zinc methylhexyldithiocarbamate
  zinc distearyldithiocarbamate
  zinc didocosanyldithiocarbamate
  zinc methylcyclododecyldithiocarbamate
  zinc ditricosanedithiocarbamate.

In a specific embodiment zinc dibutyldithiocarbamate produced outstanding results.

The quantity of zinc alkyldithiocarbamate necessary for stabilization when admixed with a radial block copolymer can vary over any range capable of producing the required stabilizing effect. Specifically, outstanding results are achieved when the zinc alkyldithiocarbamate is in the range from about 1–2 parts by weight of the radial block copolymer based upon 100 parts by weight of the radial block copolymer.

The benzotriazole useful for producing a composition stabilized against degradation due to light, particularly in the ultraviolet range, can comprise any benzotriazole which has a general formula

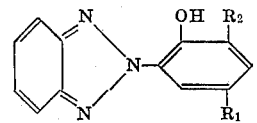

where R1 is an alkyl radical having from one–six carbon atoms and R2 is an alkyl radical having from one–six carbon atoms or hydrogen. Examples are:
  2(2-hydroxy-3,5-di-n-hexylphenyl) benzotriazole
  2(2-hydroxy-5-methylphenyl)benzotriazole
  2(2-hydroxy-5-tert-butylphenyl)benzotriazole
  2(2-hydroxy-3-methyl-5-isoamylphenyl)benzotriazole
  2(2-hydroxy-3-hexyl-5-isopropylphenyl)benzotriazole
  2(2-hydroxy-3,5-dimethylphenyl)benzotriazole. In a specific embodiment 2(2-hydroxy-5-methylphenyl)benzotriazole produced outstanding results.

The benzotriazole in this invention can exist in any quantity capable of producing the required stabilizing effect when compounded with the radial block copolymer. Particularly, the benzotriazole can exist in the range from about 1–2 parts by weight based on 100 parts by weight of the radial block copolymer.

The compositions comprising a benzotriazole compounded with an organic phosphite or zinc alkyldithiocarbamate to stabilize against light degradation, particularly in the ultraviolet range, can vary over a wide range of quantities and can comprise a variety of species.

The organic phosphites useful for compounding with the radial block copolymer in order to produce a stabilized composition having a general formula (RO)3P where R is alkyl, aryl, and cycloalkyl, and any combination thereof such as aralkyl and alkaryl radicals having one–24 carbon atoms and P is phosphorus. Specific examples of organic phosphites useful with this invention are as follows:
  tri(nonylphenyl) phosphite
  diphenyl decyl phosphite didecyl phenyl phosphite
phenyl di(2-ethylhexyl) phosphite
diisooctyl phenyl phosphite
methyl diphenyl phosphite
triphenyl phosphite
tri(dimethylphenyl) phosphite
phenyl dicyclohexyl phosphite
tri(dinonylphenyl) phosphite In a preferred embodiment tri(nonylphenyl) phosphite produced outstanding results. The benzotriazole and the zinc alkyldithiocarbamate can comprise any species corresponding to the general formulas noted above or mentioned in the specific examples. In a specific embodiment a radial block copolymer was stabilized against ultraviolet degradation very satisfactorily by utilizing tri(nonylphenyl) phosphite, and zinc dibutyldithiocarbamate, or 2(2-hydroxy-5-methylphenyl)benzotriazole. According to this invention the quantities of stabilizing additives noted above can exist in any quantity that will produce the noted stabilizing effect against light degradation when admixed with a radial block copolymer. Thus, when the radial block copolymer is compounded with the benzotriazole and the organic phosphite, outstanding results are obtained when the benzotriazole is in the range from about 0.1-0.5 parts by weight based on 100 parts by weight of the radial block copolymer and the organic phosphite is in the range from about 0.5-1.5 parts by weight based on 100 parts of the radial block copolymer. When the radial block copolymer is compounded with the benzotriazole and the zinc alkyldithiocarbamate, the benzotriazole can exist in the range from about 0.1-0.5 parts by weight based on 100 parts by weight of radial block copolymer and the zinc alkyldithiocarbamate can exist in the range from about 0.1-0.5 parts by weight based on 100 parts by weight of the radial block copolymer.

The organic phosphites, zinc alkyldithiocarbamates, and benzotriazoles that are admixed with the radial block copolymer to stabilize against both thermal and light degradation as well as the organic phosphites, zinc alkyldithiocarbamates, and carbon black that are admixed with the radial block copolymer to stabilize against light radiation can comprise a wise variety of species and exist over a wide range. The organic phosphites, zinc alkyldithiocarbamates, and benzotriazoles useful in this embodiment of the invention can comprise any species corresponding to the previous general formulas or specific examples. Any carbon black capable of producing an ultraviolet stabilizing effect when admixed with the alkyldithiocarbamate, organic phosphite, and radial block copolymer can be used with this invention. While both furnace and channel blacks are suitable, it is preferred to use a channel black having an average particle size of 10-15 microns, and more preferably a particle size of 10-12 microns. In one embodiment a carbon black of 10-12 microns average particle size produced entirely satisfactory results.

The quantities of the stabilizing additive noted above can comprise any quantity capable of producing the required stabilizing effect when admixed with the radial block copolymer. Specifically, when the organic phosphite, zinc alkyldithiocarbamate, and carbon black are admixed with the radial block copolymer to stabilize against light degradation, based on 100 parts by weight of the radial block copolymer, the organic phosphite can exist in the range from about 0.5-1.5 parts by weight, zinc alkyldithiocarbamate can exist in the range from about 0.5-1 parts by weight, and the carbon black can exist in the range from about 0.1-1 parts by weight. The organic phosphites, zinc alkyldithiocarbamate, and benzotriazole that are compounded with the radial block copolymer in order to stabilize against both thermal and ultraviolet degradation effects can comprise any quantity capable of producing the stabilizing effect. In one embodiment, based on 100 parts by weight of the radial block copolymer, the organic phosphite existed in the range from about 0.3-1.5 parts by weight, the zinc alkyldithiocarbamate existed in the range from 0.1-0.7 part by weight, and the benzotriazole existed in the range from about 0.2-1 part by weight. Specifically, outstanding results are achieved if, based on 100 parts by weight of the polymer, the organic phosphite exists in the range from 0.5-1.4 parts by weight, the zinc alkyldithiocarbamate exists in the range from 0.3-0.7 part by weight, and the benzotriazole exists in the range from 0.5-1 part by weight.

In the embodiment where the organic phosphites, zinc alkyldithiocarbamates, and benzotriazoles compounded with either carbon black or thiodipropionic acid esters to produce a composition stabilized against the degradation effects of light, particularly in the ultraviolet range, the additives can also vary among a variety of species and over a wide range of quantities. The organic phosphites, zinc alkyldithiocarbamates, and benzotriazoles can comprise any species responding to the generalized formulas or specific example noted earlier. The thiodipropionic ester of this invention can comprise any thiodipropionic ester that produces a stabilizing effect when admixed with a radial block copolymer according to this invention. Specifically, dithiodipropionic acid esters useful with this invention have a general formula $ROOCCH_2CH_2-S-CH_2CH_2COOR'$ where R and R' are similar or not similar alkyl, cycloalkyl, and aralkyl radicals having 10-24 carbon atoms. Examples are:

di-n-decyl thiodipropionate
dilauryl thiodipropionate
distearyl thiodipropionate
lauryl stearyl thiodipropionate
dicyclododecyl thiodipropionate
di(phenyloctadecyl)thiodipropionate
decyl octadecyl thiodipropionate
dimyristyl thiodipropionate or mixtures of such thiodipropionic acid esters. In a specific embodiment dilauryl thiodipropionate produced entirely satisfactory results.

The carbon black useful with this invention can comprise any structure carbon black capable of producing the stabilizing effect of this invention. Specifically, the carbon blacks noted earlier are entirely satisfactory for practicing this embodiment of the invention.

The quantities of the above light stabilizing additives may comprise any quantity capable of producing the stabilizing effect when admixed with the radial block copolymer. Specifically, when the organic phosphite, the zinc alkyldithiocarbamate, and benzotriazole is admixed with carbon black to produce a composition resistant to light degradation, based on 100 parts by weight radial block copolymer, the organic phosphite can exist in the range from about 0.5-1.5 parts by weight, the zinc alkyldithiocarbamate can exist in the range from about 0.5-1 part by weight, the benzotriazole can exist in the range from about 0.1-1 part by weight and the carbon black can exist in the range from about 0.1-1 part by weight. In the embodiment of the invention where the organic phosphite, the zinc alkyldithiocarbamate, and benzotriazole is admixed with the thiodipropionic acid ester, based on 100 parts by weight of the radial block copolymer, the organic phosphite can exist in the range from about 0.5-1.5 parts by weight, the zinc alkyldithiocarbamate can exist in the range from about 0.1-0.6 part by weight, the benzotriazole can exist in the range from about 0.1-0.6 part by weight, and the thiodipropionic acid ester can exist in the range from about 0.05-0.4 part by weight.

EXAMPLE I

A run was conducted to demonstrate the thermal stabilizing qualities of the zinc alkyldithiocarbamate when compounded with the radial block copolymer alone. In this run a radial block copolymer comprising 65 weight per cent butadiene and 35 weight per cent styrene was produced according to the teachings of U.S. Pat. No. 3,281,383 to Zelinski et et al. One hundred parts by weight of the radial block copolymer were then admixed with 1.5 parts by weight of zinc dibutyldithiocarbamate for 5 minutes at 160° F. on a plastograph. The samples were then subjected to thermal stability tests by recording the 200° C. melt flow at 5 kg. The thermal stability data are presented in table I.

TABLE I

| Thermal Stability | | |
|---|---|---|
| 200° C. Melt Flow (× 5 kilograms) | | |
| 5 min | 15 min | 30 min |
| 8.2 | 12.6 | 15.2 |

These data clearly demonstrate that the zinc alkyldithiocarbamate was effective in producing a composition stabilized against reduction in melt flow over the indicated periods of time.

EXAMPLE II

A run was conducted to demonstrate light stability of the radial block copolymer when compounded with benzotriazole alone. In this run one hundred parts by weight of the radial block copolymer of example I were admixed as in example I with 1.5 parts by weight of 2(2-hydroxy-5-methylphenyl)benzotriazole and subjected to ultraviolet radiation tests. The results of these tests are indicated in tables II and III.

TABLE II.—ULTRAVIOLET RESISTANCE

| Hours: | Percent tensile [1] |
|---|---|
| 0 | 100 |
| 30 | 97 |
| 53 | 105 |
| 100 | 95 |
| 156 | 73 |
| 206 | 46 |
| 312 | 27 |
| 396 | 19 |
| 492 | 17 |
| 594 | 16 |

[1] As a function of ultraviolet exposure.

TABLE III.—ULTRAVIOLET RESISTANCE

| Hours: | Percent elongation [1] |
|---|---|
| 0 | 100 |
| 30 | 74 |
| 53 | 73 |
| 100 | 74 |
| 156 | 66 |
| 206 | 53 |
| 312 | 34 |
| 396 | 24 |
| 492 | 16 |
| 594 | 14 |

[1] As a function of ultraviolet exposure.

Applicant has, by these data, conclusively demonstrated the stability to ultraviolet exposure of the radial block copolymer when admixed with the benzotriazole. Note particularly the excessive periods of time, 594 hours, that the composition retained satisfactory tensile and elongation properties.

EXAMPLE III

The benzotriazole and organic phosphite were then compounded with the radial block copolymer and the stability of the composition observed. Thus, 100 parts by weight of the polymer used in example I were admixed with 0.3 parts by weight 2(2-hydroxy-5-methylphenyl)benzotriazole and 1.0 parts by weight tri(nonylphenyl) phosphite in the manner described in the manner described in Example I and subjected to ultraviolet radiation testing, the results of which are presented in the tables below.

TABLE IV.—ULTRAVIOLET RESISTANCE

| Hours: | Percent tensile [1] |
|---|---|
| 0 | 100 |
| 99 | 33 |
| 214 | 15 |

[1] As a function of ultraviolet exposure.

TABLE V.—ULTRAVIOLET RESISTANCE

| Hours: | Percent elongation [1] |
|---|---|
| 0 | 100 |
| 99 | 47 |
| 214 | 11 |

[1] As a function of ultraviolet exposure.

Applicant has thus demonstrated that the radial block copolymer can be satisfactorily stabilized against ultraviolet degradation by compounding with a benzotriazole and an organic phosphite.

EXAMPLE IV

In this run the organic phosphite of example III was replaced with zinc alkyldithiocarbamate and the stability observed. In this run 100 parts by weight of the radial block copolymer used in example I were admixed with 0.3 part by weight 2(2-hydroxy-5-methylphenyl)benzotriazole and 0.3 parts by 100 zinc dibutyldithiocarbamate and mixed in the manner as described in example I and subjected to ultraviolet radiation testing, the results of which are presented in the tables below.

TABLE VI.—ULTRAVIOLET RESISTANCE

| Hours: | Percent tensile [1] |
|---|---|
| 0 | 100 |
| 99 | 17 |
| 214 | 14 |

[1] As a function of ultraviolet exposure.

TABLE VII.—ULTRAVIOLET RESISTANCE

| Hours: | Percent elongation [1] |
|---|---|
| 0 | 100 |
| 99 | 32 |
| 214 | 11 |

[1] As a function of ultraviolet exposure.

Thus, the stability of the radial block copolymer when admixed with a benzotriazole and zinc dibutyldithiocarbamate has been demonstrated. These data are similar to comparative data in example III, where the organic phosphite and benzotriazole were used.

EXAMPLE V

Here the radial block copolymer was compounded with an organic phosphite, zinc alkyldithiocarbamate, and carbon black. In this run 100 parts by weight of the polymer of example I were compounded with 1.0 part by weight tri(nonylphenyl) phosphite, 0.6 part by weight zinc dibutyldithiocarbamate, and 0.5 part by weight carbon black with a particle size between 10–12 microns and subjected to ultraviolet radiation testing. The results of the testing are presented in table VIII and table IX below.

TABLE VIII. ULTRAVIOLET RESISTANCE

| Hours: | Percent tensile [1] |
|---|---|
| 0 | 100 |
| 98 | 44 |
| 152 | 35 |
| 254 | 25 |

[1] As a function of ultraviolet exposure.

TABLE IX.—ULTRAVIOLET RESISTANCE

| Hours: | Percent elongation [1] |
|---|---|
| 0 | 100 |
| 98 | 67 |
| 152 | 59 |
| 254 | 50 |

[1] As a function of ultraviolet exposure.

These data demonstrate entirely satisfactory stabilization of the radial block copolymer when compounded with organic phosphite, zinc dibutyldithiocarbamate, and carbon black, and are superior to comparative data in examples III and IV where no carbon black was used.

EXAMPLE VI

In this run the carbon black of example V was replaced with a benzotriazole and two initial runs made. One hundred parts by weight of the radial block copolymer of example I were mixed with varying quantities of 2(2-hydroxy-5-methylphenyl)benzotriazole, tri(nonylphenyl) phosphite, and zinc dibutyldithiocarbamate and subjected to both ultraviolet and thermal stability testing. In a first run 100 parts by weight of polymer were compounded with 1.0 weight part tri(nonyphenyl) phosphite, 0.6 part by weight zinc dibutyldithiocarbamate, and 0.5 part by weight 2(2-hydroxy-5-methylphenyl)benzotriazole. In a second run 100 parts by weight of polymer were compounded with 1.0 weight part tri(nonylphenyl) phosphite, 0.3 part by weight zinc dibutyldithiocarbamate, and 0.3 part by weight 2(2-hydroxy-5-methylphenyl)benzotriazole. The compositions of these runs were subjected to ultraviolet testing, the results of which are presented in tables X and XI for run one and tables XII and XIII for run two.

TABLE X.—RUN 1 (ULTRAVIOLET RESISTANCE)

| Hours: | Percent tensile [1] |
|---|---|
| 0 | 100 |
| 98 | 40 |
| 152 | 22 |
| 254 | 16 |

[1] As a function of ultraviolet exposure.

TABLE XI.—RUN 1 (ULTRAVIOLET RESISTANCE)

| Hours: | Percent elongation [1] |
|---|---|
| 0 | 100 |
| 98 | 57 |
| 152 | 30 |
| 254 | 10 |

[1] As a function of ultraviolet exposure.

TABLE XII.—RUN 2 (ULTRAVIOLET RESISTANCE)

| Hours: | Percent tensile [1] |
|---|---|
| 0 | 100 |
| 99 | 37 |
| 214 | 17 |

[1] As a function of ultraviolet exposure.

TABLE XIII.—RUN 2 (ULTRAVIOLET RESISTANCE)

| Hours: | Percent elongation [1] |
|---|---|
| 0 | 100 |
| 99 | 53 |
| 214 | 21 |

[1] As a function of ultraviolet exposure.

These data demonstrate generally the stabilized properties of the radial block copolymer when compounded with benzotriazole, zinc dibutyldithiocarbamate, and organic phosphite. In an effort to determine ranges to the three stabilizing components that are particularly suitable for use in this invention, additional compositions of the three mentioned additives were formulated and subjected to both thermal and ultraviolet radiation degradation testing. Runs A through D were compounded as shown in table XIV below.

TABLE XIV

| Run | Zinc dibutyldithiocarbamate | Tri(nonylphenyl) phosphite | 2(2-hydroxy-5-methylphenyl) benzotriazole |
|---|---|---|---|
| A | 0.50 | 0.50 | 0.50 |
| B | 0.33 | 0.67 | 0.50 |
| C | 0.67 | 1.33 | 1.0 |
| D | 0.17 | 0.33 | 0.25 |

Data from Runs a through D are presented in table XV and analyzed thereafter.

TABLE XV

| | Thermal stability 200° C. melt flow (×5 kg.) | | | Ultraviolet resistance | | | | | | | | | | | | | | | | | | |
|---|---|---|---|---|---|---|---|---|---|---|---|---|---|---|---|---|---|---|---|---|---|---|
| | | | | Percent tensile as a function of ultraviolet exposure (hours) | | | | | | | | | Percent elongation as a function of ultraviolet exposure (hours) | | | | | | | | | |
| Run | 5 min. | 15 min. | 30 min. | 0 | 30 | 53 | 100 | 156 | 206 | 312 | 396 | 492 | 594 | 0 | 30 | 53 | 100 | 156 | 206 | 312 | 396 | 492 | 594 |
| A | 5.4 | 5.4 | 5.6 | 100 | 66 | 57 | 29 | 25 | 17 | 16 | 15 | 15 | 16 | 100 | 60 | 54 | 39 | 34 | 18 | 12 | 65 | 6.3 | 1.8 |
| B | 5.3 | 4.3 | 3.9 | 100 | 69 | 65 | 49 | 19 | 17 | 15 | 13 | 13 | 14 | 100 | 71 | 65 | 65 | 33 | 28 | 18 | 13 | 15 | 12 |
| C | 5.0 | 4.2 | 4.7 | 100 | 80 | 82 | 68 | 53 | 27 | 18 | 19 | 16 | | 100 | 76 | 73 | 74 | 63 | 62 | 39 | 28 | 28 | 20 |
| D | 4.3 | 3.8 | 3.2 | 100 | 64 | 45 | 15 | 14 | 15 | 15 | | | | 100 | 69 | 57 | 17 | 16 | 9 | 2 | | | |

The data of table XV generally indicate entirely satisfactory stabilization results are obtained over the ranges of Runs A through D; however, specific features of these data are worthy of note. Although the thermal stability data generally indicate quite satisfactory results, in the case of Runs A through C particularly outstanding results were achieved as noted by the generally more gradual reduction in flow, and in fact an increase in thermal flow was observed in Run A from 5 to 30 minutes. As regards ultraviolet resistance, all data indicate satisfactory formulations; however, outstanding results were achieved in Runs A through C as noted by the larger values at various periods of time and particularly in Runs A and B where the percent tensile actually increases from 396 to 594 hours. In summary, these data indicate that although all ranges produce quite satisfactory results, and that outstanding results are achieved in Runs A, B, and C, where an examination of table XIV reveals that, based on 100 parts by weight of the polymer, the organic phosphite comprises 0.5–1.33 parts by weight, the zinc dibutyldithiocarbmate comprises 0.33–0.67

EXAMPLE VII

Carbon black was added to the composition of example VI and stability examined. One hundred parts by weight of the radial block copolymer of example I were compounded with 1.0 part by weight tri(nonylphenyl) phosphite, 0.6 part by weight zinc dibutyldithiocarbamate, and 0.5 part by weight 2(2-hydroxy-5-methylphenyl)benzotriazole and subjected to ultraviolet testing, the results of which are presented in tables XVI and XVII below.

TABLE XVI.—ULTRAVIOLET RESISTANCE

| Hours: | Percent tensile [1] |
|---|---|
| 0 | 100 |
| 98 | 80 |
| 152 | 71 |
| 254 | 66 |

[1] As a function of ultraviolet exposure.

TABLE XVII.—ULTRAVIOLET RESISTANCE

| Hours: | Percent elongation [1] |
|---|---|
| 0 | 100 |
| 98 | 83 |
| 152 | 85 |
| 254 | 84 |

[1] As a function of ultraviolet exposure.

These data indicate that when carbon black is added to the composition of example VI particularly even more outstanding results are obtained. Note particularly that the 254 hour data from table XVI is approximately four times as great as comparative data in tables X and XII. Also the 254 hour data in table XVII is about eight times that of comparative data of table XI and four times that of table XIII and significantly greater than comparative data of table XV.

EXAMPLE VIII

In an effort to demonstrate ranges of the four additives of example VII that produce particularly outstanding results, Runs A through E were conducted with the indicated parts by weight per 100 parts by weight polymer. The same additives as in example VII were used and the composition data is presented in table XVIII.

TABLE XVIII

| Run | Zinc dibutyl-dithio-carbamate | Tri(nonyl-phenyl) phosphite | 2(2-hydroxy-5-methylphenyl)-benzotriazole | Carbon black |
|---|---|---|---|---|
| A | 0.60 | 1.0 | 0.25 | 0.25 |
| B | 0.60 | 1.0 | 0.10 | 0.40 |
| C | 0.60 | 1.0 | 0.20 | 0.30 |
| D | 0.60 | 1.0 | 0.30 | 0.20 |
| E | 0.60 | 1.0 | 0.40 | 0.10 |

The compositions of Runs A through E were then subjected to ultraviolet radiation, the results of which are presented in tables XIX and XX.

TABLE XIX

Ultraviolet resistance

Percent tensile as a function of ultraviolet exposure (hours)

| Run | 0 | 30 | 50 | 100 | 200 | 400 | 600 |
|---|---|---|---|---|---|---|---|
| A | 100 | 70 | 71 | 52 | 49 | 44 | 29 |
| B | 100 | 86 | 71 | 47 | 58 | 31 | 35 |
| C | 100 | 89 | 76 | 53 | 23 | 22 | 21 |
| D | 100 | 73 | 70 | 41 | 33 | 30 | 19 |
| E | 100 | 87 | 80 | 66 | 43 | 28 | 23 |

TABLE XX

Ultraviolet resistance

Percent elongation as a function of ultraviolet exposure (hours)

| Run | 0 | 30 | 50 | 100 | 200 | 400 | 600 |
|---|---|---|---|---|---|---|---|
| A | 100 | 68 | 66 | 66 | 61 | 61 | 44 |
| B | 100 | 79 | 76 | 70 | 78 | 50 | 35 |
| C | 100 | 84 | 85 | 77 | 62 | 38 | 34 |
| D | 100 | 74 | 68 | 58 | 56 | 50 | 37 |
| E | 100 | 89 | 82 | 81 | 62 | 50 | 43 |

These data conclusively indicate that increased stability can be obtained over the indicated range of formulations when carbon black is added to the composition of example VI. In particular, it is to be noted that although satisfactory results were obtained over all ranges examined, specifically the 600 hour data of table XIX show an increase up to about twice comparative values of table XV where no carbon black is used, and, in addition, the 600 hour data of table XX are greatly improved over comparative data in table XV. Thus, these data show that both per cent tensile and per cent elongation can be significantly improved over the results of example VI by adding carbon black to the radial block copolymer when compounded with tri(nonylphenyl) phosphite, zinc dibutyldithiocarbamate and 2(2-hydroxy-5-methylphenyl)benzotriazole.

EXAMPLE IX

One hundred parts of the radial block copolymer of example I were compounded with 1.0 part by weight tri(nonylphenyl) phosphite, 0.30 part by weight zinc dibutyldithiocarbamate, 0.20 part by weight dilaurylthiodipropionate, and 0.30 part by weight 2(2-hydroxyL-5-methylphenyl)benzotriazole and subjected to ultraviolet testing, the results of which are indicated in tables XXI and XXII.

TABLE XXI.—ULTRAVIOLET RESISTANCE

| Hours: | Percent tensile [1] |
|---|---|
| 0 | 100 |
| 99 | 57 |
| 214 | 26 |

[1] As a function of ultraviolet exposure.

TABLE XXII.—ULTRAVIOLET RESISTANCE

| Hours: | Percent elongation [1] |
|---|---|
| 0 | 100 |
| 99 | 65 |
| 214 | 42 |

[1] As a function of ultraviolet exposure.

These data indicate that when the thiodipropionic acid ester is substituted for the carbon black of example VIII that entirely satisfactory results are obtained. Note specifically that the 214 hour data of table XXI and XXII are less than comparative data of table XVI and XVII where carbon black was compounded with the three additives but generally greater than comparative data of example VI where no carbon black was added. Note specifically the improvement in the 214 hour per cent tensile as compared with comparative data of tables X, XI, XII, and XIII and comparative data in table XV of example VI, particularly Runs A, B, and C. Thus, applicant has demonstrated increased stability by adding thiodipropionic acid ester to the three additives of example VI.

I claim:

1. A stabilized polymeric composition comprising a radial block copolymer of a conjugated diene and a vinyl-substituted aromatic compound wherein, based on the weight of said copolymer, said conjugated diene is in the range of about 70–50 weight per cent and is a material selected from the group consisting of butadiene, isoprene, 2,3-methyl-1,3-butadiene, piperylene, 3-butyl-1,3-octadiene, 1-phenyl-1,3-butadiene and mixtures thereof and said vinyl-substituted aromatic compound is in the range of about 30–50 weight percent and is a material selected from the group consisting of styrene, 3-methylstyrene, 4-n-propylstyrene, 4-cyclohexylstyrene, 4-dodecylstyrene, 2-ethyl-4-benzylstyrene, 4-p-tolylstyrene, 4-(4-phenyl-n-butyl)styrene and mixtures thereof; and a stabilizing amount of at least one stabilizing additive selected from the group consisting of:

zinc alkyldithiocarbamates having the formula

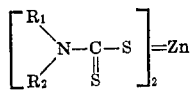

wherein R1 and R2 are selected from the class consisting of alkyl and cycloalkyl radicals having one–23 carbon atoms; or benzotriazole compounds having the formula

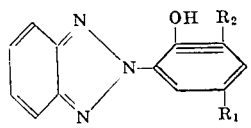

wherein R1 is an alkyl radical having one–six carbon atoms and R2 is hydrogen or an alkyl radical having one–six carbon atoms.

2. A composition according to claim 1 wherein the amount of said stabilizing additive is in the range of 1 to 2 parts by weight per 100 parts by weight of copolymer.

3. A composition according to claim 2 wherein said copolymer contains from 70–60 weight per cent, based on weight of copolymer, of butadiene and from 30–40 weight per cent, based on weight of copolymer, of styrene and said stabilizing additive is selected from the group consisting of zinc dibutyldithiocarbamate or 2(2-hydroxy-5-methylphenyl)benzotriazole.

4. A stabilized polymeric composition comprising a radial block copolymer of a conjugated diene and a vinyl-substituted aromatic compound wherein, based on the weight of said copolymer, said conjugated diene is in the range of about 70–50 weight per cent and is a material selected from the group consisting of butadiene, isoprene, 2,3-methyl-1,3-butadiene, piperylene, 3-butyl-1,3-octadiene, 1-phenyl-1,3-butadiene and mixtures thereof and said vinyl-substituted aromatic compound is in the range of about 30–50 weight per cent and is a material selected from the group consisting of styrene, 3-methylstyrene, 4-n-propylstyrene, 4-cyclohexylstyrene, 4-dodecylstyrene, 2-ethyl-4-benzylstyrene, 4-p-tolylstyrene, 4-(4-phenyl-n-butyl)styrene, and mixtures thereof; and a stabilizing amount of a stabilizing additive mixture consisting essentially of at least one benzotriazole compound having the formula

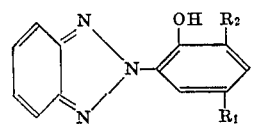

wherein R1 is an alkyl radical having one–six carbon atoms and R2 is hydrogen or an alkyl radical having one–six carbon atoms in admixture with at least one material selected from the group consisting of at least one organic phosphite having the formula $(RO)_3P$ wherein R is any combination of an alkyl, aryl, cycloalkyl, aralkyl or alkaryl radical having one–24 carbon atoms and P is phosphorus; or at least one zinc alkyldithiocarbamate having the formula

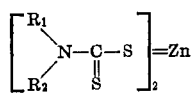

wherein R1 and R2 are selected from the group consisting of alkyl and cycloalkyl radicals having one–23 carbon atoms.

5. A polymeric composition according to claim 4 wherein the amount of benzotriazole compound is in the range of about 0.1–0.5 parts by weight per 100 parts by weight of copolymer, the amount of organic phosphite compound is in the range of about 0.5–1.5 parts by weight per 100 parts by weight of copolymer, and the amount of zinc alkyldithiocarbamate is in the range of 0.1–0.5 parts by weight per 100 parts by weight of copolymer.

6. A polymeric composition according to claim 5 wherein said copolymer consists essentially of from 70–60 weight per cent, based on total weight of copolymer, of butadiene and from about 30–40 weight per cent, based on total weight of said copolymer, of styrene; and wherein said stabilizer additive mixture consists essentially of 2(2-hydroxy-5-methylphenyl)benzotriazole in combination with at least one compound selected from the group consisting of tri(nonylphenyl)phosphite, zinc dibutyldithiocarbamate and mixtures thereof.

7. A stabilized polymeric composition comprising a radial block copolymer of a conjugated diene and a vinyl-substituted aromatic compound wherein, based on the weight of said copolymer, said conjugated diene is in the range of about 70–50 weight per cent and is a material selected from the group consisting of butadiene, isoprene, 2,3-methyl-1,3-butadiene, piperylene, 3-butyl-1,3-octadiene, 1-phenyl-1,3-butadiene, and mixtures thereof and said vinyl-substituted aromatic compound is in the range of from about 30–50 weight per cent and is a material selected from the group consisting of styrene, 3-methylstyrene, 4-n-propylstyrene, 4-cyclohexylstyrene, 4-dodecylstyrene, 2-ethyl-4-benzylstyrene, 4-p-tolylstyrene, 4-(4-phenyl-n-butyl)styrene and mixtures thereof; and a stabilizing amount of a mixture of the following stabilizer additive components:

at least one organic phosphite having the general formula $(RO)_3P$ where R is any combination of an alkyl, aryl, cycloalkyl, aralkyl or alkaryl radical having one–24 carbon atoms and P is phosphorous;

at least one zinc alkyldithiocarbamate having the formula

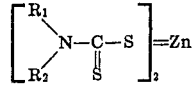

wherein R1 and R2 are selected from the group consisting of alkyl and cycloalkyl radicals having one–23 carbon atoms; and carbon black.

8. A composition of matter according to claim 7 wherein said organic phosphite is present in an amount in the range of about 0.5–1.5 parts by weight per 100 parts by weight of copolymer; said zinc alkyldithiocarbamate is present in an amount in the range of about 0.5–1 parts by weight per 100 parts of copolymer and said carbon black is present in an amount in the range of 0.1–1.0 parts by weight per 100 parts by weight of copolymer.

9. A polymeric composition of claim 8 wherein said copolymer consists essentially of from 60–70 weight percent butadiene and from 30–40 weight percent styrene; said organic phosphite is tri(nonylphenyl)phosphite and said zinc alkyldithiocarbamate is zinc dibutyldithiocarbamate.

10. A stabilized polymeric composition comprising a radial block copolymer of a conjugated diene and a vinyl-substituted aromatic compound wherein, based on the weight of said polymer, said conjugated diene is in the range of about 70–50 weight percent and is a material selected from the group consisting of butadiene, isoprene, 2,3-methyl-1,3-butadiene, piperylene, 3-butyl-1,3-octadiene, 1-phenyl-1,3-butadiene and mixtures thereof and said vinyl-substituted aromatic compound is in the range of about 30–50 weight percent and is a material selected from the group consisting of styrene, 3-methylstyrene, 4-n-propylstyrene, 4-cyclohexylstyrene, 4-dodecylstyrene, 2-ethyl-4-benzylstyrene, 4-p-tolylstyrene, 4-(4-phenyl-n-butyl)styrene and mixtures thereof; and a stabilizing amount of a combination of the following stabilizer components:

at least one organic phosphite having the general formula (RO)₃P wherein R is any combination of an alkyl, aryl, cycloalkyl, aralkyl and alkaryl radical having one–24 carbon atoms and P is phosphorus;

at least one zinc alkyldithiocarbamate having the formula

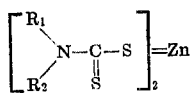

wherein R₁ and R₂ are selected from the class consisting of alkyl and cycloalkyl radicals having from one to 23 carbon atoms and mixtures thereof; and at least one benzotriazole compound having the formula

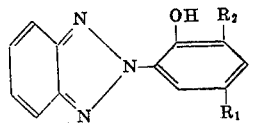

wherein R₁ is an alkyl radical having from one to six carbon atoms and R₂ is selected from the class consisting of hydrogen or alkyl radicals having from one to six carbon atoms.

11. A stabilized polymeric composition according to claim 10 wherein said organic phosphite is present in an amount in the range of about 0.3–1.5 parts by weight per 100 parts by weight of copolymer; said zinc alkyldithiocarbamate is present in an amount in the range of about 0.1–0.7 parts by weight per 100 parts by weight of copolymer; and said benzotriazole is present in an amount in the range of about 0.2–1 parts by weight per 100 parts by weight of copolymer.

12. A composition according to claim 11 wherein said copolymer consists essentially of from about 70–60 weight percent of butadiene and from 30–40 weight percent of styrene; said organic phosphite comprises 0.5–1.4 parts by weight per 100 parts by weight of copolymer of tri(nonylphenyl) phosphite; said zinc dialkyldithiocarbamate comprises 0.3–0.7 parts by weight per 100 parts by weight of copolymer of zinc dibutyldithiocarbamate; and said benzotriazole comprises 0.5–1 parts by weight per 100 parts by weight of copolymer of 2(2-hydroxy-5-methylphenyl)benzotriazole.

13. A stabilized polymeric composition comprising a radial block copolymer of a conjugated diene and a vinyl-substituted aromatic compound wherein, based on the weight of said polymer, said conjugated diene is in the range of about 70–50 weight percent and is a material selected from the group consisting of butadiene, isoprene, 2,3-methyl-1,3-butadiene, piperylene, 3-butyl-1,3-octadiene, 1-phenyl-1,3-butadiene and mixtures thereof and said vinyl-substituted aromatic compound is in the range of about 30–50 weight percent and is a material selected from the group consisting of styrene, 3-methyl styrene, 4-n-propylstyrene, 4-cyclohexylstyrene, 4-dodecylstyrene, 2-ethyl-4-benzylstyrene, 4-p-tolylstyrene, 4-(4-phenyl-n-butyl)styrene and mixtures thereof; and a stabilizing amount of the following stabilizer additive components:

at least one organic phosphite having the general formula (RO)₃P wherein R is any combination of alkyl, aryl, cycloalkyl, aralkyl or alkaryl radicals having one–24 carbon atoms and P is phosphorus;

at least one zinc alkyldithiocarbamate having the formula

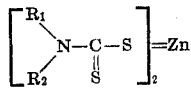

wherein R₁ and R₂ are selected from the group consisting of alkyl or cycloalkyl radicals having one–23 carbon atoms;

at least one benzotriazole compound having the formula

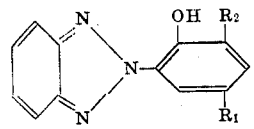

wherein R₁ is an alkyl radical having from one–six carbon atoms and R₂ is selected from the group consisting of hydrogen and alkyl radicals having from one–six carbon atoms; and carbon black.

14. A composition of matter according to claim 13 wherein said organic phosphite is present in an amount in the range of about 0.5–1.5 parts by weight per 100 parts by weight of copolymer; said zinc alkyldithiocarbamate is present in an amount in the range of about 0.5–1 parts by weight per 100 parts by weight of copolymer; said benzotriazole compound is present in an amount in the range of about 0.1–1 parts by weight per 100 parts by weight of copolymer; and said carbon black is present in an amount in the range of about 0.1–1 parts by weight per 100 parts by weight of copolymer.

15. A polymeric composition according to claim 14 wherein said copolymer consists essentially of from about 70–60 weight percent butadiene and from about 30 to about 40 weight percent styrene; said organic phosphite comprises tri(nonylphenyl)phosphite; said zinc alkyldithiocarbamate comprises zinc dibutyldithiocarbamate; and said benzotriazole comprises 2(2-hydroxy-5-methylphenyl)benzotriazole.

16. A stabilized composition of matter comprising a radial block copolymer of a conjugated diene and a vinyl-substituted aromatic compound wherein, based on the weight of said polymer, said conjugated diene is in the range of about 70–50 weight percent and is a material selected from the group consisting of butadiene, isoprene, 2,3-methyl-1,3-butadiene, piperylene, 3-butyl-1,3-octadiene, 1-phenyl-1,3-butadiene and mixtures thereof and said vinyl-substituted aromatic compound is in the range of about 30–50 weight percent and is a material selected from the group consisting of styrene, 3-methylstyrene, 4-n-propylstyrene, 4-cyclohexylstyrene, 4-dodecylstyrene, 2-ethyl-4-benzylstyrene, 4-p-tolylstyrene, 4-(4-phenyl-n-butyl)styrene and mixtures thereof; and a stabilizing amount of a mixture of the following stabilizer additive components:

at least one organic phosphite having the general formula (RO)₃P wherein R is any combination of an alkyl, aryl, cycloalkyl, aralkyl and alkaryl radical having from one to 24 carbon atoms and P is phosphorus;

at least one zinc alkyldithiocarbamate having the formula

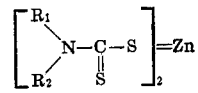

wherein R₁ and R₂ are selected from the class consisting of alkyl and cycloalkyl radicals having from one–23 carbon atoms;

at least one benzotriazole compound having the formula

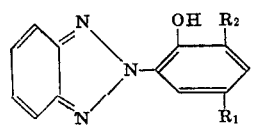

wherein $R_1$ is an alkyl radical having from one–six carbon atoms and $R_2$ is selected from the group consisting of hydrogen and alkyl radicals having from one–six carbon atoms; and at least one thiodipropionic acid ester having the formula ROOCCH$_2$CH$_2$S-CH$_2$CH$_2$COOR' wherein R and R' are similar or nonsimilar alkyl, cycloalkyl aryl radicals having 10–24 carbon atoms.

17. A stabilized polymeric composition according to claim 16 wherein said organic phosphite is present in an amount in the range of about 0.5–1.5 parts by weight per 100 parts by weight of copolymer; said zinc alkyldithiocarbamate is present in an amount in the range of about 0.1–0.6 parts by weight per 100 parts by weight of copolymer; said benzotriazole compound is present in an amount in the range of about 0.1–0.6 parts by weight per 100 parts by weight of copolymer; and said thiodipropionic acid ester is present in an amount in the range of about 0.05–0.4 parts by weight per 100 parts by weight of copolymer.

18. A stabilized polymeric composition according to claim 17 wherein said copolymer consists essentially of from about 70–60 weight percent of butadiene and from about 30–40 weight percent styrene; said organic phosphite comprises tri(nonylphenyl)phosphite; said zinc alkyldithiocarbamate comprises zinc dibutyldithiocarbamate; said benzotriazole compound comprises 2(2-hydroxy-5-methylphenyl)benzotriazole; and said thiodipropionic acid ester comprises dilaurylthiodipropionate.

* * * * *

UNITED STATES PATENT OFFICE

CERTIFICATE OF CORRECTION

Patent No. 3,624,026　　　　　　　　　　　　　　Dated: November 30, 1971

William O. Drake

It is certified that error appears in the above-identified patent and that said Letters Patent are hereby corrected as shown below:

Column 11, line 15, delete "R1 and R2" and insert — $R_1$ and $R_2$ —;

lines 18-23; delete the formula as shown and insert therefor the following formula — 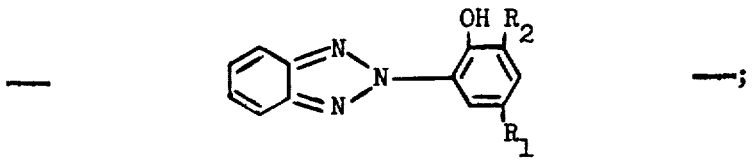 —;

line 24, delete "R1" and insert — $R_1$ —; line 59, delete "R1" and insert — $R_1$ —; line 60, delete "R2" and insert — $R_2$ —; line 63, delete "(RO)3P" and insert — $(RO)_3P$ —; line 73, delete "R1 and R2" and insert — $R_1$ and $R_2$ —.

Column 12, line 8, after "copolymer" insert a period — . —; line 36, delete "(RO)3P" and insert — $(RO)_3P$ —; line 38, delete "phosphorous" and insert — phosphorus —; line 44, delete "R1 and R2" and insert — $R_1$ and $R_2$ —.

Column 13, lines 18-23, delete the formula as shown and insert therefor the following formula — 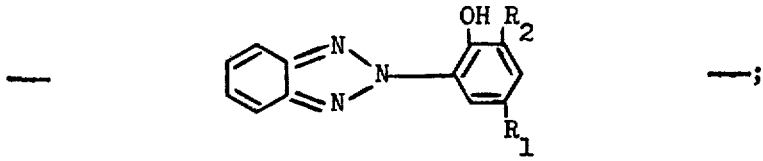 —;

line 38, after "copolymer" insert a period — . —.

Column 14, line 17, after "black" insert a period — . —.

Column 15, line 6, delete "ROOCCH$_2$CH$_2$S—CH$_2$CH$_2$COOR'" and insert therefor — ROOCCH$_2$CH$_2$-S-CH$_2$CH$_2$COOR' —; line 7, after "cycloalkyl" insert — and —.

Signed and sealed this 13th day of June 1972.

(SEAL)
Attest:

EDWARD M. FLETCHER, JR.　　　　　　　　　　　ROBERT GOTTSCHALK
Attesting Officer　　　　　　　　　　　　　　　Commissioner of Patents